United States Patent
Larsson et al.

(10) Patent No.: US 9,353,859 B2
(45) Date of Patent: May 31, 2016

(54) PARK LOCK MECHANISM

(71) Applicant: e-AAM Driveline Systems AB, Trollhättan (SE)

(72) Inventors: Lars U. Larsson, Trollhättan (SE); Martin Persson, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 99 days.

(21) Appl. No.: 14/475,655

(22) Filed: Sep. 3, 2014

(65) Prior Publication Data
US 2016/0061323 A1 Mar. 3, 2016

(51) Int. Cl.
*B60W 10/18* (2012.01)
*F16H 63/34* (2006.01)

(52) U.S. Cl.
CPC .................................. *F16H 63/3433* (2013.01)

(58) Field of Classification Search
CPC ..... F16H 63/3433; F16H 25/08; F16H 63/48; F16H 57/10
See application file for complete search history.

(56) References Cited

U.S. PATENT DOCUMENTS

| | | | | |
|---|---|---|---|---|
| 3,912,050 A * | 10/1975 | Iwanaga | .................. | F16H 63/48 188/69 |
| 5,429,212 A * | 7/1995 | Schlosser | ............. | B60K 7/0007 188/265 |
| 5,695,030 A * | 12/1997 | Medcalf, Jr. | ............ | B60T 1/005 188/170 |
| 5,807,205 A | 9/1998 | Odaka et al. | | |
| 6,074,321 A | 6/2000 | Maeda et al. | | |
| 6,692,394 B2 | 2/2004 | Takenaka | | |
| 6,872,165 B2 * | 3/2005 | Gierer | ..................... | B60T 1/005 188/105 |
| 7,448,978 B2 | 11/2008 | Habel | | |
| 8,651,991 B1 * | 2/2014 | Sten | ........................ | F16H 48/30 475/150 |
| 9,109,634 B2 * | 8/2015 | Tronnberg | ............. | F16D 28/00 |
| 2005/0159861 A1 | 7/2005 | Iwatsuki et al. | | |
| 2011/0094806 A1 | 4/2011 | Mack et al. | | |
| 2012/0058855 A1 | 3/2012 | Sten | | |
| 2013/0220763 A1 * | 8/2013 | Hyde | .................. | F16H 63/3433 192/69.7 |
| 2014/0346004 A1 * | 11/2014 | Landino | .................. | B60T 1/005 192/219.5 |

\* cited by examiner

*Primary Examiner* — David J Hlavka
(74) *Attorney, Agent, or Firm* — Harness, Dickey & Pierce, P.L.C.

(57) ABSTRACT

A park lock mechanism having first and second actuator assemblies for selectively moving a cam against a cam follower to engage a pawl to a dog ring. The first actuator assembly can be selectively operated to coordinate movement of the cam between first and second cam positions. The second actuator assembly can be selectively operated to drive the cam from the first cam position to the second cam position.

14 Claims, 5 Drawing Sheets

PARK LOCK MECHANISM

FIELD

The present disclosure relates to a park lock mechanism.

BACKGROUND

This section provides background information related to the present disclosure which is not necessarily prior art.

Park lock mechanisms are commonly integrated into transmissions and vehicle driveline components and help to immobilize a vehicle when the vehicle is parked and not in use. Known park lock mechanism typically include a dog ring, which is coupled to a rotatable component of the driveline component for common rotation, and a pawl that is selectively engagable with the dog ring. While the known park lock mechanisms are suitable for their intended purpose, they nevertheless remain susceptible to improvement.

SUMMARY

This section provides a general summary of the disclosure, and is not a comprehensive disclosure of its full scope or all of its features.

In one form the present disclosure provides a park lock mechanism for a vehicle driveline component having a rotatable member. The park lock mechanism includes a housing, a dog ring, a pawl, a pawl spring, a cam follower, a cam, a first actuator assembly and a second actuator assembly. The dog ring is configured to be coupled to the rotatable member for common rotation. The dog ring is received in the housing and includes a plurality of circumferentially spaced apart teeth. The pawl has a pawl tooth and is pivotably coupled to the housing for movement about a pivot axis between a first pivot position, in which the pawl tooth is disengaged from the teeth of the dog ring so as to not impede rotation of the dog ring relative to the housing, and a second pivot position in which the pawl tooth engages the teeth of the dog ring so as to impede rotation of the dog ring relative to the housing. The pawl spring biases the pawl toward the first pivot position. The cam follower is coupled to the pawl for movement therewith about the pivot axis. The cam is rotatable about a movement axis that is transverse to the pivot axis between a first cam position and a second cam position. The cam contacts the follower and includes a first cam portion and a second cam portion. Positioning of the cam in the first cam position orients the first cam portion on the cam follower to thereby position the pawl in the first pivot position. Positioning of the cam in the second cam position orients the second cam portion on the cam follower to thereby position the pawl in the second pivot position. The first actuator assembly is selectively operable to rotate the cam between the first and second cam positions. The first actuator assembly has a first actuator and a lost motion coupling. The first actuator includes a first output member that is rotatable about the movement axis. The lost motion coupling has a coupling input, which is mounted on the first output member, and a coupling output. The lost motion coupling is configured to decouple the first output member from the coupling output within a predetermined range of motion of the coupling output relative to the first output member. The cam is mounted on the coupling output. The second actuator assembly is selectively operable to rotate the cam from the first cam position to the second cam position. The second actuator assembly has a second actuator and a loader. The second actuator has a second output member that is axially movable along the movement axis between a first loader position, in which the loader is disengaged from the cam, and a second loader position, in which the loader is engaged to the cam. The second actuator assembly is configured to drive the cam toward the second cam position when the loader is positioned in the second loader position. Operation of the second actuator assembly to rotate the cam from the first cam position to the second cam position does not cause corresponding motion of the first output member.

In another form, the preset disclosure provides a method for inhibiting rotation of a rotatable member of a vehicle driveline component. The method includes: coupling a dog ring to the rotatable member, the dog ring having a plurality of circumferentially spaced apart teeth; pivotally mounting a pawl for movement above a pivot axis between a first pivot position, in which a pawl tooth of the pawl is disengaged from the teeth of the dog ring so as not to impede rotation of the dog ring, and a second pivot position in which the pawl tooth engages the teeth of the dog ring so as to impede rotation of the dog ring; biasing the pawl toward the first pivot position; providing a cam follower on the pawl; mounting a cam for rotation about a movement axis, which is transverse to the pivot axis, between a first cam position and a second cam position, the cam contacting the follower and including a first cam portion and a second cam portion, wherein positioning of the cam in the first cam position orients the first cam portion on the cam follower to thereby position the pawl in the first pivot position, and wherein positioning of the cam in the second cam position orients the second cam portion on the cam follower to thereby position the pawl in the second pivot position; operating a first actuator assembly to drive the cam from the first cam position to the second cam position; operating the first actuator assembly to drive the cam from the second cam position to the first cam position; and operating a second actuator assembly to drive the cam from the first cam position to the second cam position.

In still another form, the present disclosure provides a park lock mechanism for a vehicle driveline component having a rotatable member. The park lock mechanism includes a housing, a dog ring, a pawl, a pawl spring, a cam follower, a cam, a first actuator assembly and a second actuator assembly. The housing has a blocking member. The dog ring is configured to be coupled to the rotatable member for common rotation about a rotation axis. The dog ring is received in the housing and includes a plurality of circumferentially spaced apart teeth. The pawl has a pawl tooth and is pivotably coupled to the housing for movement about a pivot axis that is parallel to the rotation axis. The pawl is pivotable between a first pivot position, in which the pawl tooth is disengaged from the teeth of the dog ring so as to not impede rotation of the dog ring relative to the housing, and a second pivot position in which the pawl tooth engages the teeth of the dog ring so as to impede rotation of the dog ring relative to the housing. The pawl spring biases the pawl toward the first pivot position. The cam follower is coupled to the pawl for movement therewith about the pivot axis. The cam is pivotably coupled to the housing and rotatable about a movement axis that is transverse to the pivot axis. The cam is movable between a first cam position and a second cam position. The cam is configured to contact the cam follower and has a first cam portion and a second cam portion. Positioning of the cam in the first cam position orients the first cam portion on the cam follower. The first cam portion is configured to cooperate with the cam follower to position the pawl in the first pivot position. Positioning of the cam in the second cam position orients the second cam portion on the cam follower. The second cam portion is configured to cooperate with the cam follower to position the pawl in the second pivot position. The first actuator assembly is selectively operable to rotate the cam between the first and second cam positions. The first actuator assembly has a first actuator, a coupling and a first biasing member. The first actuator is a rotary device with a first output member that is rotatable about the movement axis in a first rotary direction and a second rotary direction. The coupling is coupled to the first output member and cooperates with the first biasing member to couple the cam to the first output member in a manner that biases the cam in the first rotary direction relative to the coupling but permits the cam to be moved in the second rotary direction relative to the coupling when the pawl is prevented from moving into the second pivot position due to contact between the pawl tooth and one of the teeth of the dog ring. The second actuator assembly is selectively operable to rotate the cam from the first cam position to the second cam position. The second actuator assembly having a second actuator, a loader, and a second biasing member. The second actuator includes a linear actuator having a second output member that is axially movable along the movement axis. The loader is coupled to the second output member for axial movement therewith and rotation about the movement axis. The second biasing member biases the loader in the first rotary direction relative to the second output member. The loader is movable along the movement axis between a first loader position, in which the loader is disengaged from the cam, and a second loader position, in which the loader is engaged to the cam. Contact between the blocking member and the loader when the loader is in the first loader position limits rotational movement of the loader in the first rotary direction. Positioning of the loader in the second loader position when the cam is in the first cam position couples the loader to the cam for common rotation about the movement axis and spaces the loader axially apart from the blocking member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
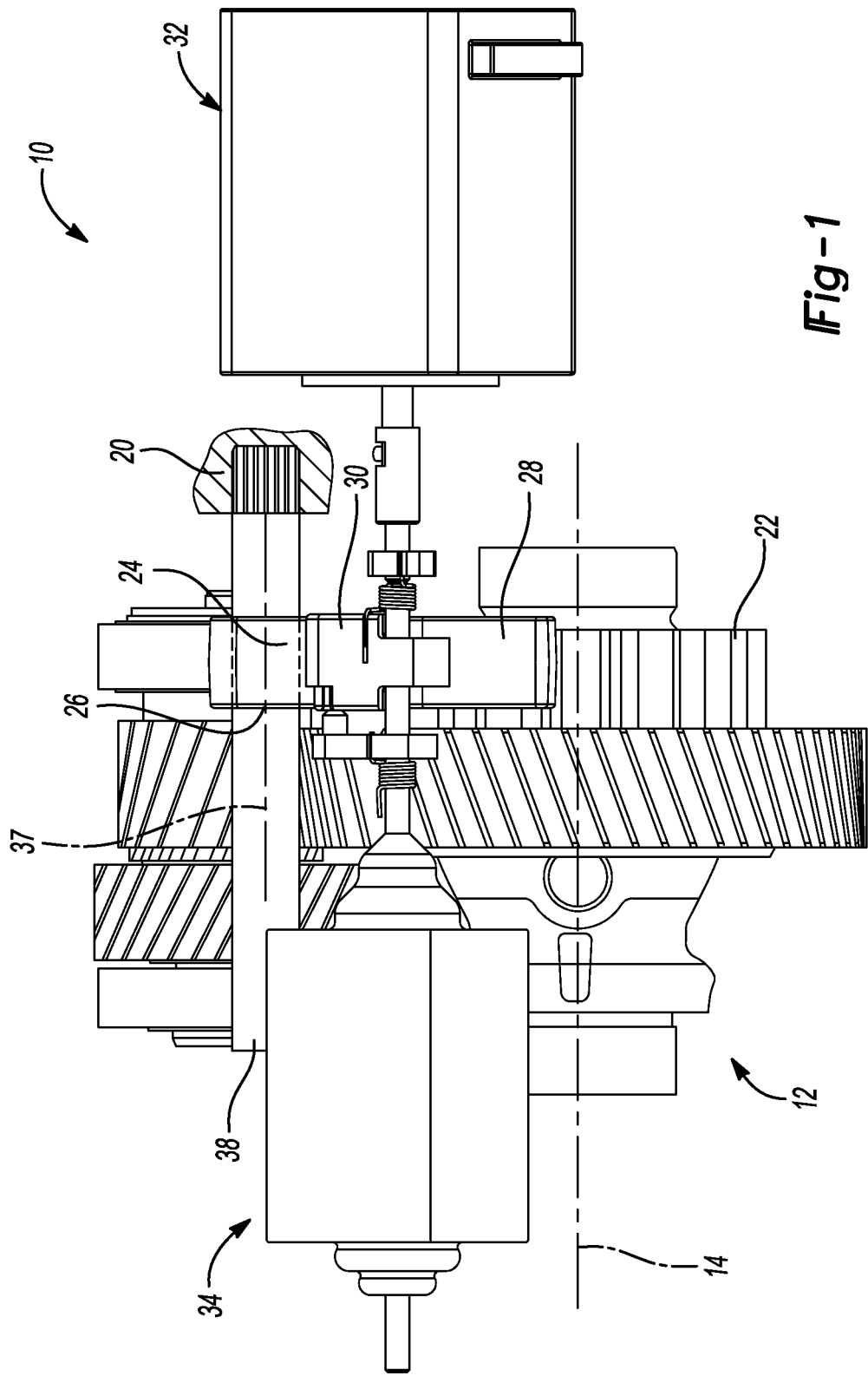
FIG. 1 is a partly sectioned elevation view of a park lock mechanism constructed in accordance with the teachings of the present disclosure, the park lock mechanism being illustrated in operative association with an exemplary vehicle driveline component.

With reference to FIG. 1 of the drawings, a park lock mechanism 10 constructed in accordance with the teachings of the present disclosure is shown in operative association with an exemplary vehicle driveline component 12. In the particular example provided, the driveline component 12 is a differential case that is rotatable about a driven axis 14, but those of skill in the art will appreciate that other rotatable elements of a driveline component could be employed in the alternative.

Figure 2:
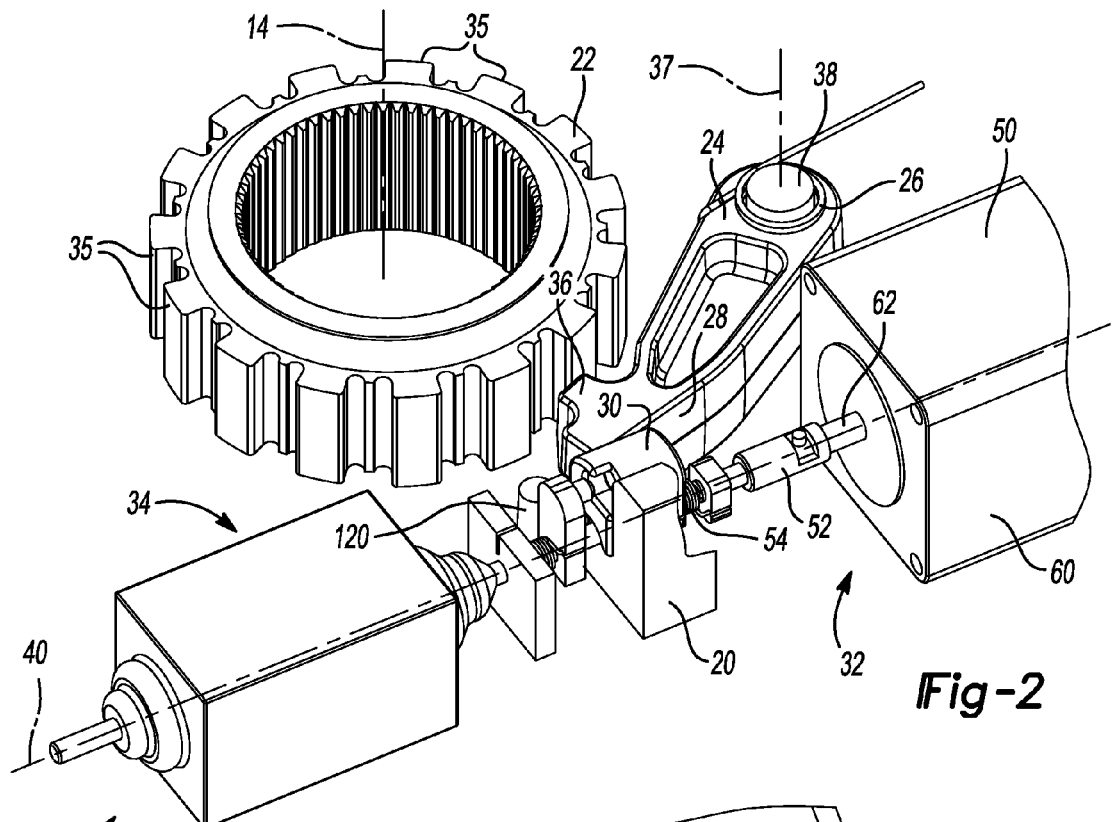
FIG. 2 is a perspective view of the park lock mechanism of FIG. 1.
Figure 4:
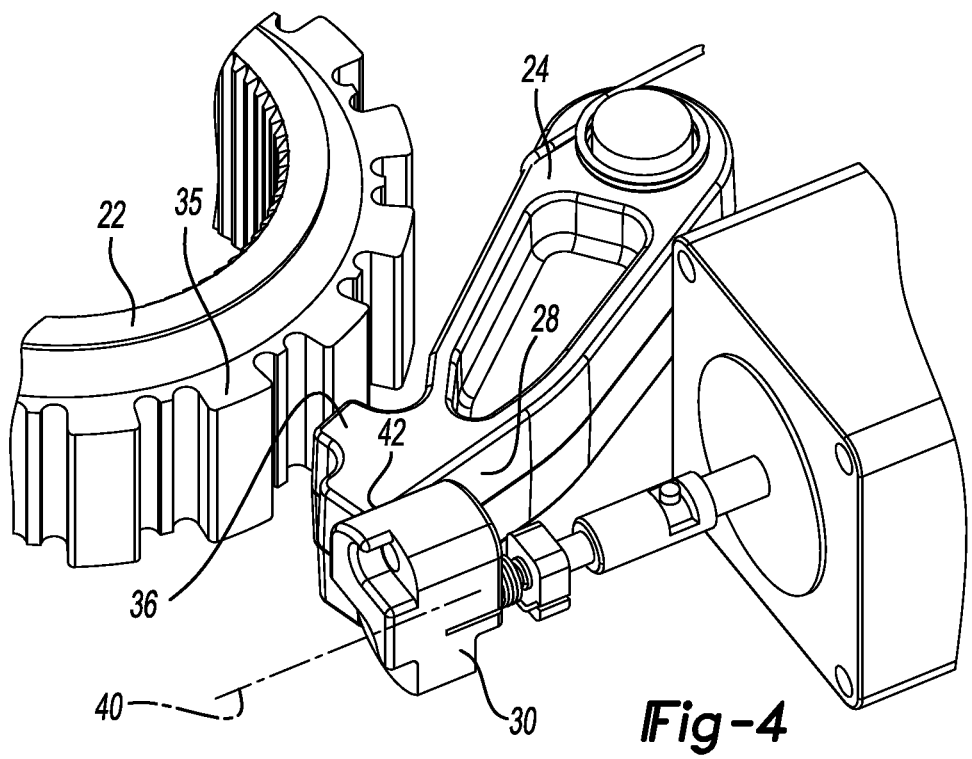
FIG. 4 is a perspective view of a portion of the park lock mechanism of FIG. 1 depicting a pawl in a first pivot position and a cam in a first cam position.

With additional reference to FIG. 2, the park lock mechanism 10 can comprise a housing 20, a dog ring 22, a pawl 24, a pawl spring 26, a cam follower 28, a cam 30, a first actuator assembly 32 and a second actuator assembly 34. The housing 20, the dog ring 22, the pawl 24 and the pawl spring 26 can be configured in a conventional and well known manner and as such, these components need not be described in significant detail herein. Briefly, the housing 20 can be configured to house a portion of the park lock mechanism 10 and can optionally be configured to house the vehicle driveline component 12. In the example provide, the housing 20 houses portions of the park lock mechanism 10 as well as components associated with a drive module of the type that is disclosed in commonly assigned U.S. Pat. No. 8,663,051 entitled "Axle Assembly With Torque Distribution Drive Mechanism", the disclosure of which is incorporated by reference as if fully set forth in detail herein. The dog ring 22 can be an annular structure that can define a plurality of circumferentially spaced apart teeth 35. The dog ring 22 can be mounted to the driveline component 12 for common rotation about the driven axis 14. The pawl 24 can have a pawl tooth 36 and can be mounted to the housing 20 for pivoting motion about a pivot axis 37 between a first pivot position (FIG. 4), in which the pawl tooth 36 is disengaged from the teeth 35 of the dog ring 22 so as to not impede rotation of the dog ring 22 relative to the housing 20, and a second pivot position (FIG. 5) in which the pawl tooth 36 engages the teeth 35 of the dog ring 22 so as to impede rotation of the dog ring 22 relative to the housing 20. The pivot axis 37 can be parallel to the driven axis 14. In the example provided, the pawl 24 is fixedly mounted on a cylindrically-shaped rail 38 that is rotatably coupled to the housing 20. The pawl spring 26 is configured to bias the pawl 24 toward the first pivot position. In the example provided, the pawl spring 26 is a torsion spring that is mounted to the rail 38 and engaged to the housing 20.

The cam follower 28 can be coupled to the pawl 24 for movement therewith about the pivot axis 37. In the particular example provided, the cam follower 28 is a surface of the pawl 24 that is contacted by the cam 30. As such, the cam follower 28 is configured similar to a flat-ended cam follower. Those of ordinary skill in the art will appreciate, however, that the cam follower 28 could be configured somewhat differently and could comprise a roller or other structure that is configured to reduce friction between the cam follower 28 and the cam 30.

Figure 3:
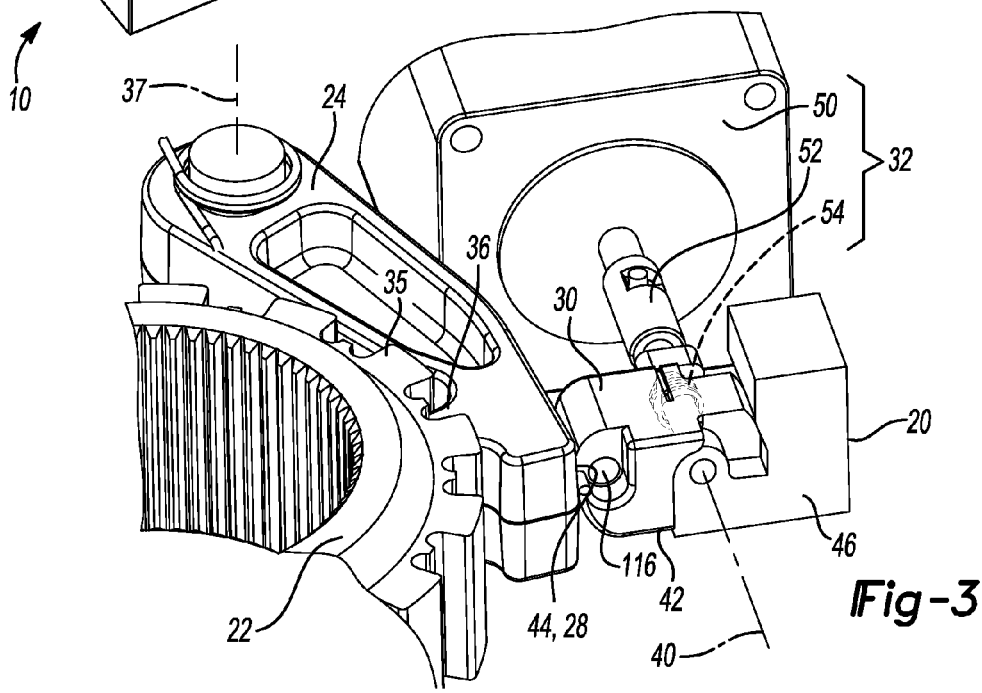
FIG. 3 is a perspective view of a portion of the park lock mechanism of FIG. 1.
Figure 5:
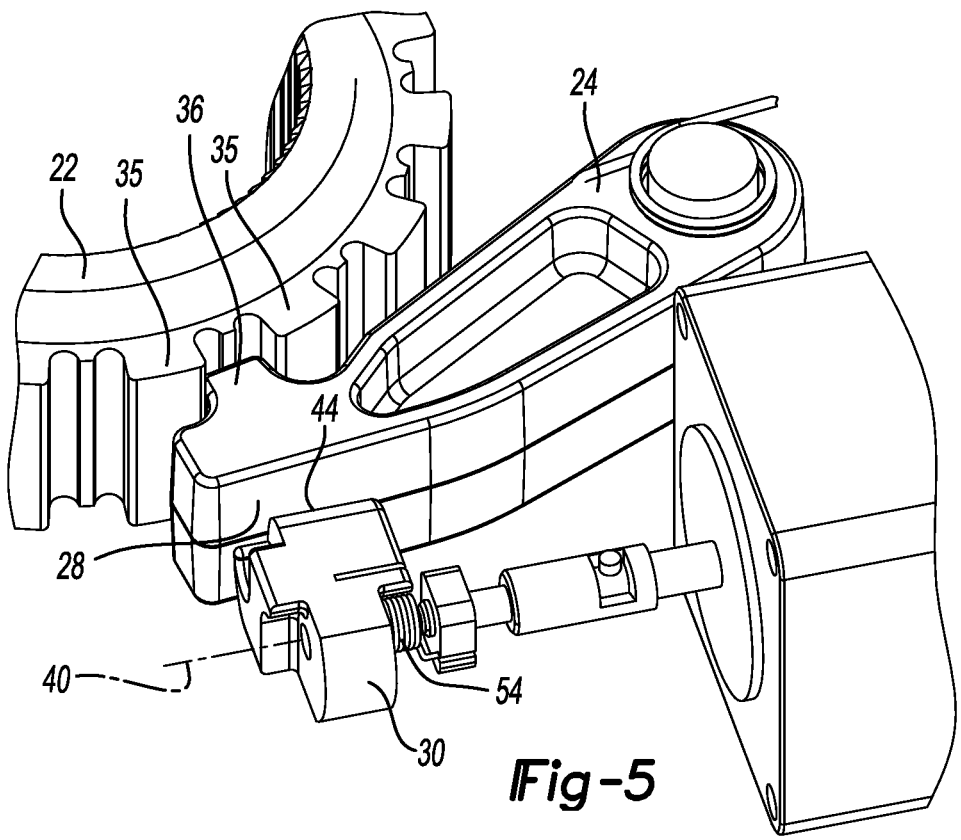
FIG. 5 is a perspective view of a portion of the park lock mechanism of FIG. 1 depicting the pawl in a second pivot position and the cam in a second cam position.

With reference to FIGS. 2 and 3, the cam 30 can be coupled to the housing 20 and can be pivot-able about a movement axis 40 that can be transverse to the pivot axis 37. In the particular example provided, the cam 30 is pivotally mounted directly to the housing 20. The cam 30 can comprise a first cam portion 42 and a second cam portion 44 and can be pivoted about the movement axis 40 between a first cam position (FIG. 4) and a second cam position (FIG. 5). When the cam 30 is in the first cam position, the first cam portion 42 can contact the cam follower 28 so that the cam 30 and the cam follower 28 cooperate to position the pawl 24 in the first pivot position. When the cam 30 is in the second cam position, the second cam portion 44 can contact the cam follower 28 so that the cam 30 and the cam follower 28 cooperate to position the pawl 24 in the second pivot position. Optionally, the cam 30 can include a third cam portion 46 that can contact the housing 20 when the cam 30 is positioned in the second cam position so that load transmitted from the pawl 24 to the cam 30 can be transmitted through the third cam portion 46 into the housing 20.

The first actuator assembly 32 is configured to selectively rotate the cam 30 between the first and second cam positions. In the example provided, the first actuator assembly 32 comprises a first actuator 50, a lost motion coupling 52 and optionally a first biasing member 54.

The first actuator 50 can comprise a rotary actuator that can have a first output member 60 and a motor 62 that is configured to drive the first output member 60 about the movement axis 40. The motor 62 can be powered in any desired manner, such as electrically or via fluid power (e.g., hydraulic fluid power, pneumatic fluid power).

Figure 6:
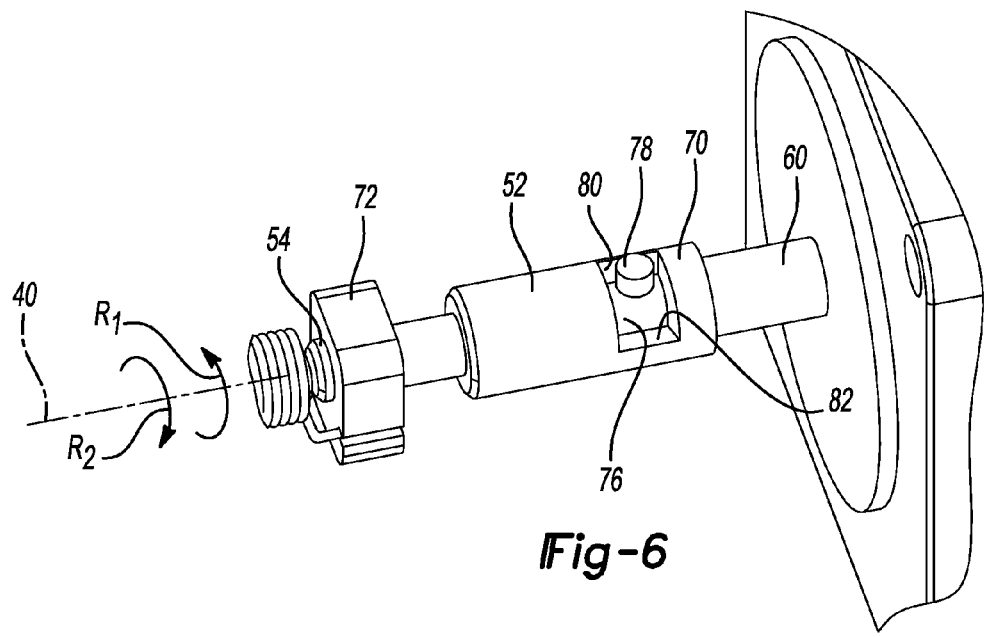
FIG. 6 is an enlarged portion of FIG. 2 that illustrates a portion of a first actuator assembly in more detail.
Figure 7:
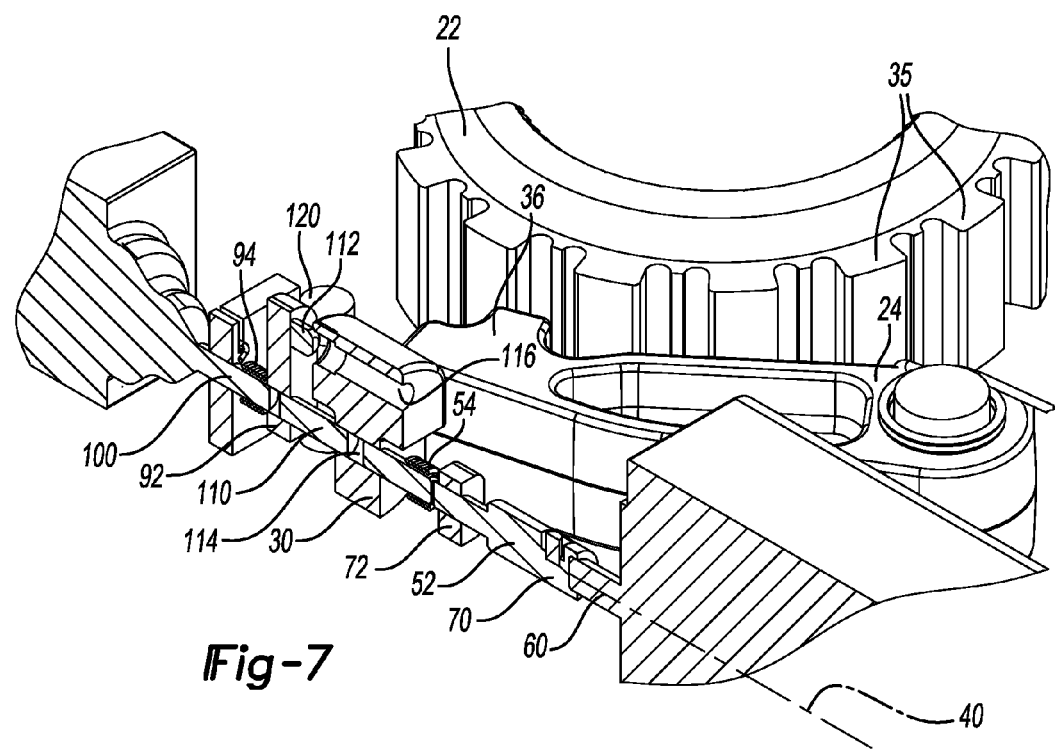
FIG. 7 is a section view of the park lock mechanism of FIG. 1 taken along a movement axis.

With reference to FIGS. 6 and 7, the lost motion coupling 52 comprises a coupling input 70 and a coupling output 72 and is disposed between the first output member 60 and the cam 30. The lost motion coupling 52 is configured to decouple the first output member 60 from the coupling output 72 within a predetermined range of motion of the coupling output 72 relative to the first output member 60. In the particular example provided, the coupling input 70 of lost motion coupling 52 comprises a slotted aperture 76 into which a pin 78 that is fixedly mounted to the first output member 60 is received. The slotted aperture 76 has first and second end walls 80 and 82, respectively, that are spaced circumferentially apart from one another. Contact between the pin 78 and the first end wall 80 permits the first output member 60 to drive the coupling input 70 in a first rotary direction (R1), while contact between the pin 78 and the second end wall 82 permits the first output member 60 to drive the coupling input in a second rotary direction (R2) that is opposite the first rotary direction (R1). The cam 30 can be mounted on the coupling output 72.

The first biasing member 54 can be configured to permit rotation of the cam 30 relative to the first output member 60 when movement of the pawl 24 into the second pivot position is impeded by contact between the pawl tooth 36 and one of the teeth 35 of the dog ring 22. The first biasing member 54 can be located in any desired manner, such as between the cam 30 and the coupling output 72. In the particular example provided, the first biasing member 54 comprises a torsion spring that is coupled to the cam 30 and the coupling output 72 and is configured to bias the cam 30 in the first rotary direction (R1) relative to the coupling output 72 and the first output member 60.

Figure 8:
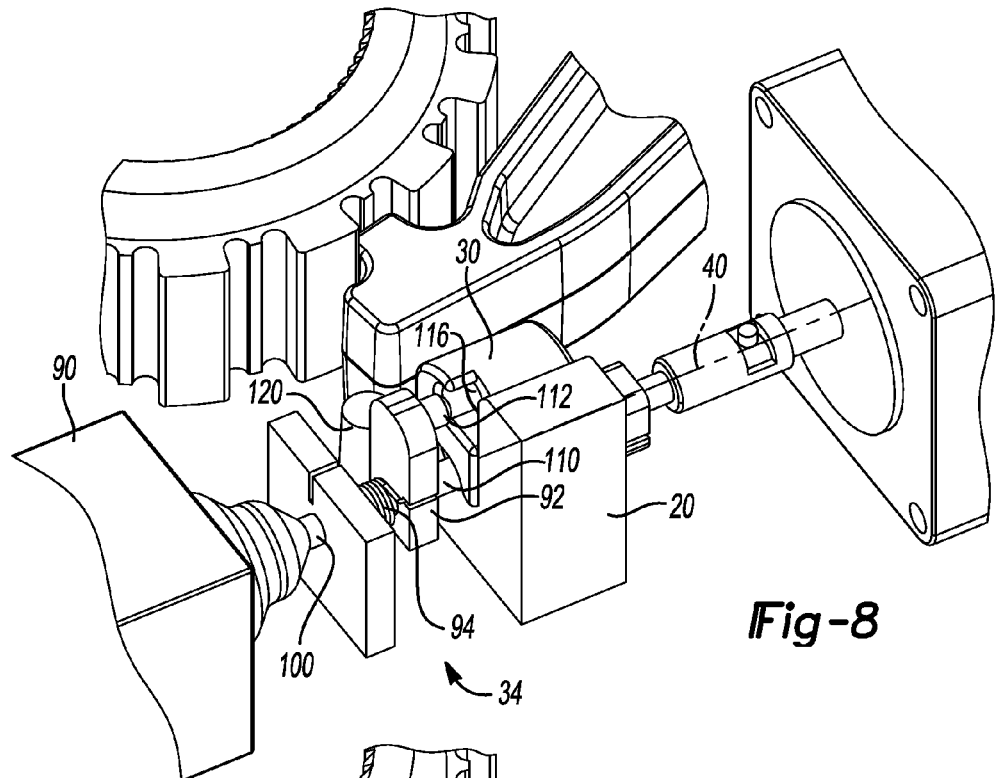
FIG. 8 is a perspective view of a portion of the park lock mechanism of FIG. 1.

In FIG. 8, the second actuator assembly 34 is selectively operable to rotate the cam 30 between the first and second cam positions. The second actuator assembly 34 can include a second actuator 90, a loader 92 and optionally a second biasing member 94.

Figure 9:
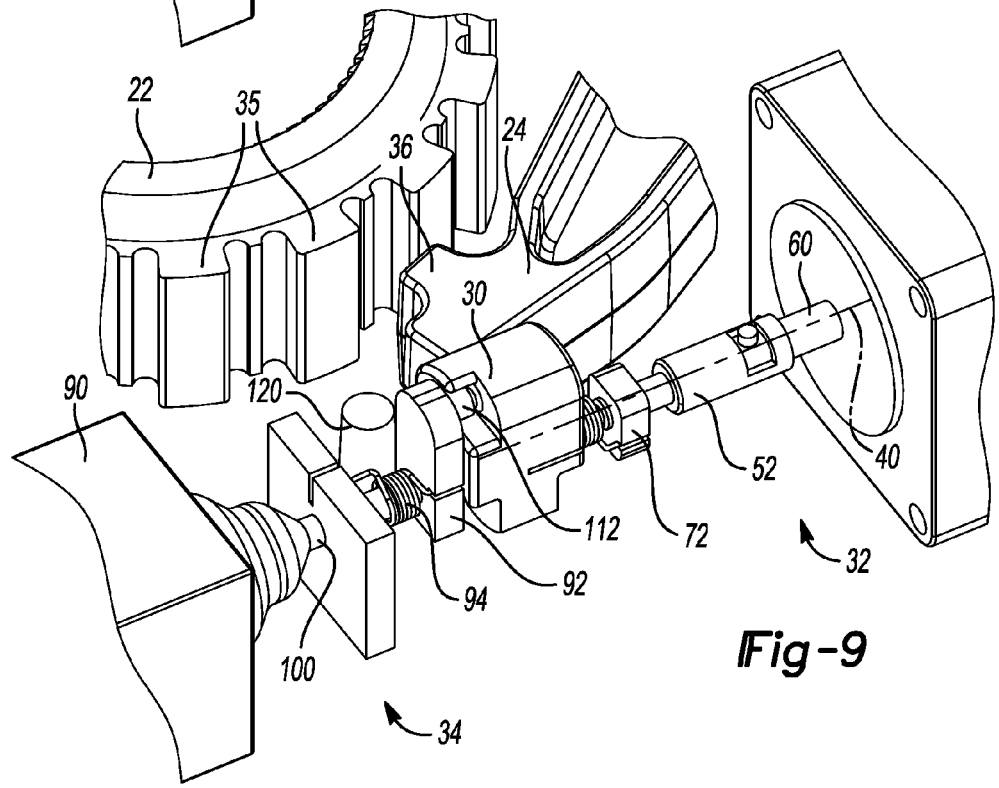
FIG. 9 is a perspective view of a portion of the park lock mechanism of FIG. 1 with a portion of the housing removed for clarity.

The second actuator 90 can be any type of linear actuator, such as a solenoid, a lead screw or fluid powered cylinder. The second actuator 90 can have a second output member 100 that can be movable along the movement axis 40 between a first loader position (FIG. 8) and a second loader position (FIG. 9).

With reference to FIGS. 7 and 8, the loader 92 can be mounted to the second output member 100 for translation therewith along the movement axis 40. In the example provided, the loader 92 is also pivot-ably mounted to the second output member 100. The loader 92 can be configured to clear the cam 30 (i.e., be spaced apart from the cam 30) when the second output member 100 is in the first loader position, as is shown in FIGS. 7 and 8, and can be configured to engage the cam 30 when the second output member 100 is in the second loader position as is shown in FIG. 9. Engagement of the loader 92 to the cam 30 when the second output member 100 is in the second loader position should be sufficient to at least permit rotary power to be transmitted between the loader 92 and the cam 30 to cause the cam 30 to move from the first cam position toward the second cam position. In the example provided, the loader 92 comprises a guide pin 110 and a drive pin 112 that engage the cam 30 when the second output member 100 is positioned in the second loader position. The guide pin 110 can be configured to engage a guide recess 114 in the cam 30 that is disposed about the movement axis 40. The positioning of the guide pin 110 in the guide recess 114 can support the loader 92 on a side that is opposite the second output member 100 (to thereby provide support, albeit indirectly, for the distal end of the second output member 100). Alternatively, the guide recess 114 could be formed in a portion of the housing 20. While the guide pin 110 has been described as being mounted on the loader 92, it will be appreciated that in the alternative, the guide recess 114 could be formed in the loader 92 and that the guide pin 110 could be mounted to the cam 30 or to the housing 20. The drive pin 112 can be configured to engage a drive lug 116 formed on the cam 30.

The second biasing member 94 can be configured to bias the loader 92 relative to the second output member 100 in the first rotary direction. In the example provided, the second biasing member 94 is a torsion spring that is mounted to the housing 20 and to the loader 92. Alternatively, the torsion spring could be mounted to the second output member 100 and the loader 92. Also alternatively, the torsion spring could be mounted to the second output member 100 and the housing 20, provided that the second output member 100 is rotatable about the movement axis 40 and the loader 92 is fixedly mounted to the second output member 100.

When the second output member 100 is in the first loader position, the loader 92 is positioned proximate a blocking member 120 that is formed on the housing 20. The second biasing member 94 biases the loader 92 against the blocking member 120 and the blocking member 120 operably limits rotation of the loader 92 in the first rotary direction.

When the cam 30 is in the first cam position and the second output member 100 is moved into the second loader position, the loader 92 is spaced apart from the blocking member 120 as is shown in FIG. 9. Accordingly, the blocking member 120 no longer interferes with rotation of the loader 92 in the first rotary direction so that the second biasing member 94 can urge the loader 92 in the first rotary direction. Since the second output member 100 is in the second loader position, the loader 92 is engaged to the cam 30 so that both the cam 30 and at least a portion of the lost motion coupling 52 (e.g., the coupling output 72) will rotate with the loader 92 in the first rotary direction. It will therefore be appreciated that operation of the second actuator assembly 34 will cause movement of the cam 30 from the first cam position toward the second cam position to urge engagement of the pawl tooth 36 to the teeth 35 of the dog ring 22. Due to the configuration of the lost motion coupling 52, operation of the second actuator assembly 34 to move the cam 30 from the first cam position to the second cam position does not require corresponding rotational movement of the first output member 60. It will be understood, however, that the lost motion coupling 52 is not a required element of the park lock mechanism 10 so that operation of the second actuator assembly 34 to move the cam 30 from the first cam position to the second cam position may entail corresponding rotational movement of the first output member 60.

In the particular example provided, the second actuator assembly 34 is not configured to move the cam 30 from the second cam position to the first cam position (i.e., the second actuator assembly 34 is not configured to cause the pawl tooth 36 to disengage the teeth 35 of the dog ring 22). Rather, the first actuator assembly 32 is operated to cause the cam 30 to be returned to the first cam position. Accordingly, the second actuator 90 is not operated to move the second output member 100 from the second loader position to the first loader position until the first actuator assembly 32 has returned the cam 30 to the first cam position. If desired, the second actuator 90 can be configured with an internal spring (not shown) that is configured to urge the second output member 100 toward the first loader position and the blocking member 120 can be configured to contact the loader 92 to limit axial movement of the loader 92 away from the cam 30 so that the loader 92 does not disengage the cam 30.

In view of the above discussion, it will be appreciated that the preset disclosure provides a method for inhibiting rotation of a rotatable member of a vehicle driveline component. The method includes: coupling a dog ring to the rotatable member, the dog ring having a plurality of circumferentially spaced apart teeth; pivotally mounting a pawl for movement above a pivot axis between a first pivot position, in which a pawl tooth of the pawl is disengaged from the teeth of the dog ring so as not to impede rotation of the dog ring, and a second pivot position in which the pawl tooth engages the teeth of the dog ring so as to impede rotation of the dog ring; biasing the pawl toward the first pivot position; providing a cam follower on the pawl; mounting a cam for rotation about a movement axis, which is transverse to the pivot axis, between a first cam position and a second cam position, the cam contacting the follower and including a first cam portion and a second cam portion, wherein positioning of the cam in the first cam position orients the first cam portion on the cam follower to thereby position the pawl in the first pivot position, and wherein positioning of the cam in the second cam position orients the second cam portion on the cam follower to thereby position the pawl in the second pivot position; operating a first actuator assembly to drive the cam from the first cam position to the second cam position; operating the first actuator assembly to drive the cam from the second cam position to the first cam position; and operating a second actuator assembly to drive the cam from the first cam position to the second cam position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

| | |
|---|---|
| park lock mechanism | 10 |
| driveline component | 12 |
| driven axis | 14 |
| housing | 20 |
| dog ring | 22 |
| pawl | 24 |
| pawl spring | 26 |
| cam follower | 28 |
| cam | 30 |
| first actuator assembly | 32 |
| second actuator assembly | 34 |
| teeth | 35 |
| pawl tooth | 36 |
| pivot axis | 37 |
| rail | 38 |
| movement axis | 40 |
| first cam portion | 42 |
| second cam portion | 44 |
| third cam portion | 46 |
| first actuator | 50 |
| lost motion coupling | 52 |
| first baising member | 54 |
| first output member | 60 |
| motor | 62 |
| coupling input | 70 |
| coupling output | 72 |
| slotted aperture | 76 |
| pin | 78 |
| first end wall | 80 |
| second end wall | 82 |
| second actuator | 90 |
| loader | 92 |
| second biasing member | 94 |
| second output member | 100 |
| guide pin | 110 |
| drive pin | 112 |
| guide recess | 114 |
| drive lug | 116 |
| blocking member | 120 |

What is claimed is:

1. A park lock mechanism for a vehicle driveline component having a rotatable member, the park lock mechanism comprising:
    a housing;
    a dog ring that is adapted to be coupled to the rotatable member for common rotation, the dog ring being received in the housing and comprising a plurality of circumferentially spaced apart teeth;
    a pawl having a pawl tooth, the pawl being pivotably coupled to the housing for movement about a pivot axis between a first pivot position, in which the pawl tooth is disengaged from the teeth of the dog ring so as to not impede rotation of the dog ring relative to the housing, and a second pivot position in which the pawl tooth engages the teeth of the dog ring so as to impede rotation of the dog ring relative to the housing;
    a pawl spring that biases the pawl toward the first pivot position;
    a cam follower that is coupled to the pawl for movement therewith about the pivot axis;
    a cam that is rotatable about a movement axis that is transverse to the pivot axis between a first cam position and a second cam position, the cam contacting the cam follower and including a first cam portion and a second cam portion, wherein positioning of the cam in the first cam position orients the first cam portion on the cam follower to thereby position the pawl in the first pivot position, and wherein positioning of the cam in the second cam position orients the second cam portion on the cam follower to thereby position the pawl in the second pivot position;

a first actuator assembly that is selectively operable to rotate the cam from the first cam position to the second cam position, the first actuator assembly having a first actuator and a lost motion coupling, the first actuator comprising a first output member that is rotatable about the movement axis, the lost motion coupling having a coupling input, which is mounted on the first output member, and a coupling output, the lost motion coupling being configured to decouple the first output member from the coupling output within a predetermined range of motion of the coupling output relative to the first output member, the cam being mounted on the coupling output; and a second actuator assembly that is selectively operable to rotate the cam between the first and second cam positions, the second actuator assembly having a second actuator and a loader, the second actuator having a second output member that is axially movable along the movement axis between a first loader position, in which the loader is disengaged from the cam, and a second loader position, in which the loader is engaged to the cam, the second actuator assembly being configured to drive the cam toward the second cam position when the loader is positioned in the second loader position;

wherein operation of the second actuator assembly to rotate the cam from the first cam position to the second cam position does not cause corresponding motion of the first output member.

2. The park lock mechanism of claim 1, wherein the housing comprises a blocking member that limits rotation of the loader in a first rotational direction when the second output member is in the first loader position.

3. The park lock mechanism of claim 2, wherein the blocking member does not interfere with rotation of the loader in the first rotational direction when the loader is in the second loader position.

4. The park lock mechanism of claim 2, wherein the second actuator assembly comprises a biasing member that biases the loader in the first rotational direction relative to the second output member, the biasing member being configured to permit rotation of the loader relative to the second output member when the second actuator assembly is operated to drive the loader in the first rotational direction and movement of the pawl into the second pawl position is impeded by contact between the pawl tooth and one of the teeth of the dog ring.

5. The park lock mechanism of claim 1, wherein the cam is pivotally mounted to the housing.

6. The park lock mechanism of claim 1, wherein the first actuator assembly comprises a first biasing member that permits rotation of the cam relative to the first output member when movement of the pawl into the second pivot position is impeded by contact between the pawl tooth and one of the teeth of the dog ring.

7. The park lock mechanism of claim 6, wherein the first biasing member is disposed between the cam and the coupling output of the lost motion coupling.

8. A method for inhibiting rotation of a rotatable member of a vehicle driveline component, the method comprising:

coupling a dog ring to the rotatable member, the dog ring having a plurality of circumferentially spaced apart teeth;

pivotally mounting a pawl for movement above a pivot axis between a first pivot position, in which a pawl tooth of the pawl is disengaged from the teeth of the dog ring so as not to impede rotation of the dog ring, and a second pivot position in which the pawl tooth engages the teeth of the dog ring so as to impede rotation of the dog ring;

biasing the pawl toward the first pivot position;
providing a cam follower on the pawl;
mounting a cam for rotation about a movement axis, which is transverse to the pivot axis, between a first cam position and a second cam position, the cam contacting the cam follower and including a first cam portion and a second cam portion, wherein positioning of the cam in the first cam position orients the first cam portion on the cam follower to thereby position the pawl in the first pivot position, and wherein positioning of the cam in the second cam position orients the second cam portion on the cam follower to thereby position the pawl in the second pivot position;

operating a first actuator assembly in a first rotational direction that tends to drive the cam from the first cam position to the second cam position;

operating the first actuator assembly in a second rotational direction opposite the first rotational direction to permit the cam to be driven from the second cam position to the first cam position; and operating a second actuator assembly in a third rotational direction that tends to drive the cam from the first cam position to the second cam position.

9. The method of claim 8, wherein after the second actuator assembly is operated in the third rotational direction, the method further comprises:

operating the first actuator assembly in the second rotational direction; and operating the second actuator assembly in a fourth rotational direction, the fourth rotational direction being opposite the third rotational direction.

10. A park lock mechanism for a vehicle driveline component having a rotatable member, the park lock mechanism comprising:

a housing having a blocking member;

a dog ring that is adapted to be coupled to the rotatable member for common rotation about a rotation axis, the dog ring being received in the housing and comprising a plurality of circumferentially spaced apart teeth;

a pawl having a pawl tooth, the pawl being pivotably coupled to the housing for movement about a pivot axis that is parallel to the rotation axis, the pawl being pivotable between a first pivot position, in which the pawl tooth is disengaged from the teeth of the dog ring so as to not impede rotation of the dog ring relative to the housing, and a second pivot position in which the pawl tooth engages the teeth of the dog ring so as to impede rotation of the dog ring relative to the housing;

a pawl spring that biases the pawl toward the first pivot position;

a cam follower that is coupled to the pawl for movement therewith about the pivot axis;

a cam that is pivotably coupled to the housing and rotatable about a movement axis that is transverse to the pivot axis, the cam being movable between a first cam position and a second cam position, the cam being configured to contact the cam follower and having a first cam portion and a second cam portion, wherein positioning of the cam in the first cam position orients the first cam portion on the cam follower, the first cam portion being configured to cooperate with the cam follower to position the pawl in the first pivot position, and wherein positioning of the cam in the second cam position orients the second cam portion on the cam follower, the second cam portion being configured to cooperate with the cam follower to position the pawl in the second pivot position;

a first actuator assembly that is selectively operable to rotate the cam between the first and second cam positions, the first actuator assembly having a first actuator, a coupling and a first biasing member, the first actuator being a rotary device having a first output member that is rotatable about the movement axis in a first rotary direction and a second rotary direction, the coupling being coupled to the first output member, the coupling and the first biasing member cooperating to couple the cam to the first output member in a manner that biases the cam in the first rotary direction relative to the coupling but permits the cam to be moved in the second rotary direction relative to the coupling when the pawl is prevented from moving into the second pivot position due to contact between the pawl tooth and one of the teeth of the dog ring; and a second actuator assembly that is selectively operable to rotate the cam from the first cam position to the second cam position, the second actuator assembly having a second actuator, a loader, and a second biasing member, the second actuator comprising a linear actuator having a second output member that is axially movable along the movement axis between a first loader position and a second loader position, the loader being coupled to the second output member for axial movement therewith and rotation about the movement axis, the second biasing member biasing the loader in the first rotary direction relative to the housing, wherein the loader is disengaged from the cam when the second output member is positioned in the first loader position, and wherein the loader is engaged to the cam when the second output member is positioned in the second loader position;

wherein contact between the blocking member and the loader when the second output member is in the first loader position limits rotational movement of the loader in the first rotary direction, and wherein positioning of the second output member in the second loader position when the cam is in the first cam position couples the loader to the cam for common rotation about the movement axis and spaces the loader axially apart from the blocking member.

11. The park lock mechanism of claim 10, wherein the coupling is a lost motion coupling.

12. The park lock mechanism of claim 11, wherein the lost motion coupling is coupled to the first output member such that at least a portion of the lost motion coupling is configured to rotate in the first rotary direction relative to the first output member through a first predetermined range.

13. The park lock mechanism of claim 11, wherein operation of the second actuator assembly to rotate the cam from the first cam position to the second cam position does not cause corresponding motion of the first output member.

14. The method of claim 9, wherein the method further comprises decoupling the second actuator assembly from the cam.

* * * * *